United States Patent
Oda

(10) Patent No.: US 7,988,220 B2
(45) Date of Patent: Aug. 2, 2011

(54) WHEEL PANT DEVICE FOR A VEHICLE AND CONTROL METHOD THEREOF

(75) Inventor: Kazunori Oda, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 215 days.

(21) Appl. No.: 12/087,249

(22) PCT Filed: Dec. 27, 2006

(86) PCT No.: PCT/IB2006/003771
§ 371 (c)(1),
(2), (4) Date: Jun. 27, 2008

(87) PCT Pub. No.: WO2007/074381
PCT Pub. Date: Jul. 5, 2007

(65) Prior Publication Data
US 2008/0315622 A1    Dec. 25, 2008

(30) Foreign Application Priority Data

Dec. 27, 2005  (JP) .................................. 2005-375847
Dec. 25, 2006  (JP) .................................. 2006-346879

(51) Int. Cl.
*B62D 37/02*  (2006.01)

(52) U.S. Cl. .................. 296/180.1; 296/180.3; 280/757; 301/41.1

(58) Field of Classification Search ................ 296/180.1, 296/180.2, 180.5; 301/41.1; 280/757; 180/197, 180/271; B62D 37/02
See application file for complete search history.

(56) References Cited

U.S. PATENT DOCUMENTS

| | | | | |
|---|---|---|---|---|
| 3,776,587 A | * | 12/1973 | Oxlade | 296/180.5 |
| 3,790,206 A | * | 2/1974 | Backowski | 296/180.5 |
| 4,131,308 A | * | 12/1978 | Holka et al. | 296/180.5 |
| 4,489,806 A | * | 12/1984 | Shimomura | 180/313 |
| 4,558,897 A | * | 12/1985 | Okuyama et al. | 296/180.5 |
| 5,013,080 A | * | 5/1991 | Garrone et al. | 296/180.1 |
| 5,184,832 A | * | 2/1993 | Miwa | 296/198 |
| 5,267,160 A | * | 11/1993 | Ito et al. | 701/42 |
| 5,350,035 A | * | 9/1994 | Bodier et al. | 180/271 |
| 5,502,433 A | * | 3/1996 | Breuer et al. | 340/438 |

(Continued)

FOREIGN PATENT DOCUMENTS

DE   28 38 998    3/1980

(Continued)

OTHER PUBLICATIONS

MT translation of the applicant cited patent JP-A5-105124.*

(Continued)

*Primary Examiner* — Glenn Dayoan
*Assistant Examiner* — Pinel E Romain
(74) *Attorney, Agent, or Firm* — Finnegan, Henderson, Farabow, Garrett & Dunner, LLP

(57) ABSTRACT

In a wheel pant device (12), wheel pant plates (34 and 36) that form this wheel pant device are able to be rotated in at least a vehicle width direction. By detecting a driving state of a vehicle using a detecting device and rotating the wheel pant plates of the wheel pant device (12) in response to that detected driving state, the airflow acting on the vehicle can be controlled, thereby enabling the driving performance of the vehicle to be improved.

11 Claims, 15 Drawing Sheets

U.S. PATENT DOCUMENTS

| | | | | |
|---|---|---|---|---|
| 6,033,010 A * | 3/2000 | Preiss | ............... | 296/180.1 |
| 6,253,142 B1 * | 6/2001 | Sauter et al. | ............... | 701/82 |
| 6,270,118 B1 * | 8/2001 | Ichikawa | ............... | 280/757 |
| 6,286,893 B1 * | 9/2001 | Presley | ............... | 296/180.5 |
| 6,856,868 B1 * | 2/2005 | Le et al. | ............... | 701/38 |
| 6,886,883 B2 * | 5/2005 | Jacquemard et al. | ....... | 296/180.5 |
| 7,055,891 B2 * | 6/2006 | Jungert | ............... | 296/180.5 |
| 7,380,869 B2 * | 6/2008 | Nakaya | ............... | 296/180.1 |
| 7,637,563 B2 * | 12/2009 | Plett et al. | ............... | 296/198 |
| 7,661,753 B2 * | 2/2010 | Shinedling et al. | ........ | 296/180.5 |
| 2004/0015284 A1 * | 1/2004 | Suissa | ............... | 701/71 |
| 2005/0273240 A1 * | 12/2005 | Brown et al. | ............... | 701/70 |

FOREIGN PATENT DOCUMENTS

| | | |
|---|---|---|
| FR | 2 673 591 | 9/1992 |
| JP | 4-151382 | 5/1992 |
| JP | 4-237685 | 8/1992 |
| JP | 5-105124 | 4/1993 |
| WO | WO 2007/119270 | 10/2007 |
| WO | WO 2007/119270 A1 * | 10/2007 |

OTHER PUBLICATIONS

International Search Report.
Written Opinion of the ISR.
Japanese Office Action dated Jul. 15, 2008.

* cited by examiner

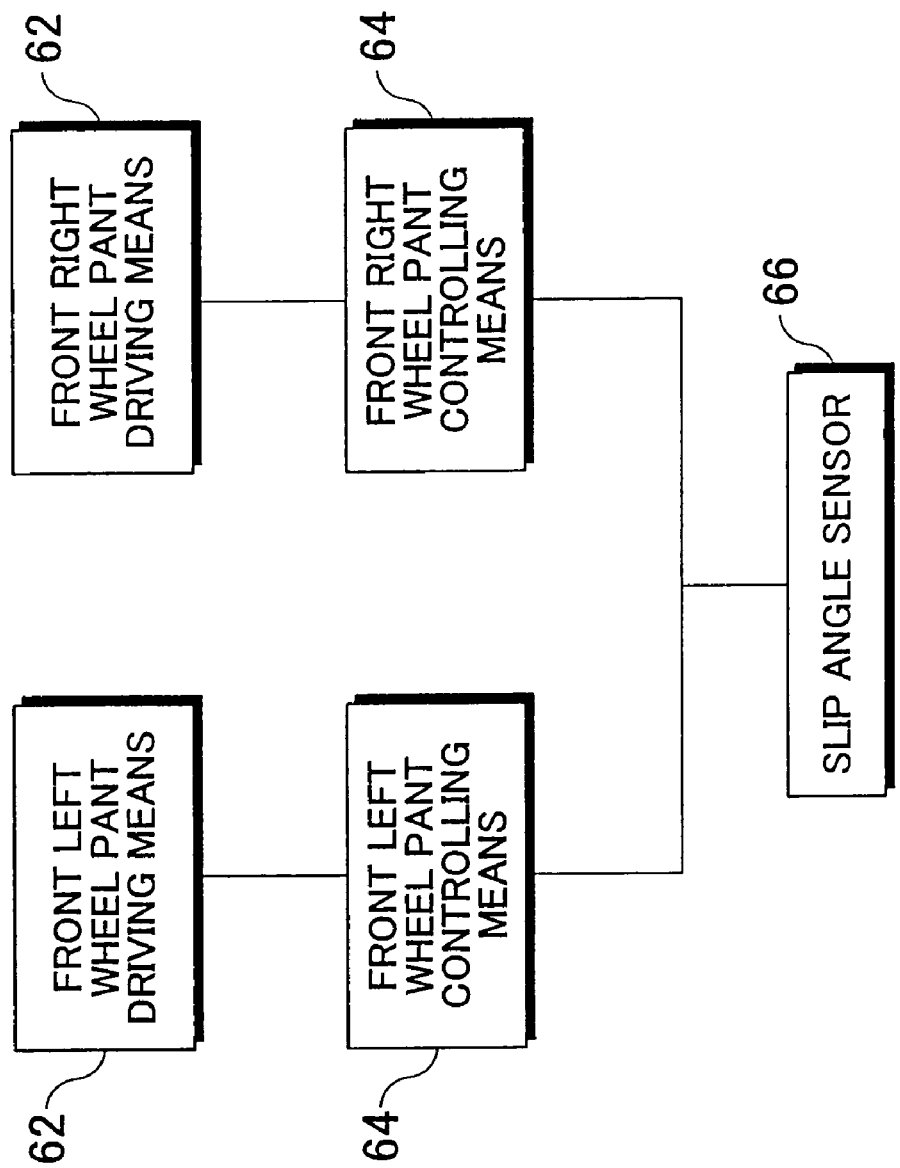

F I G . 14
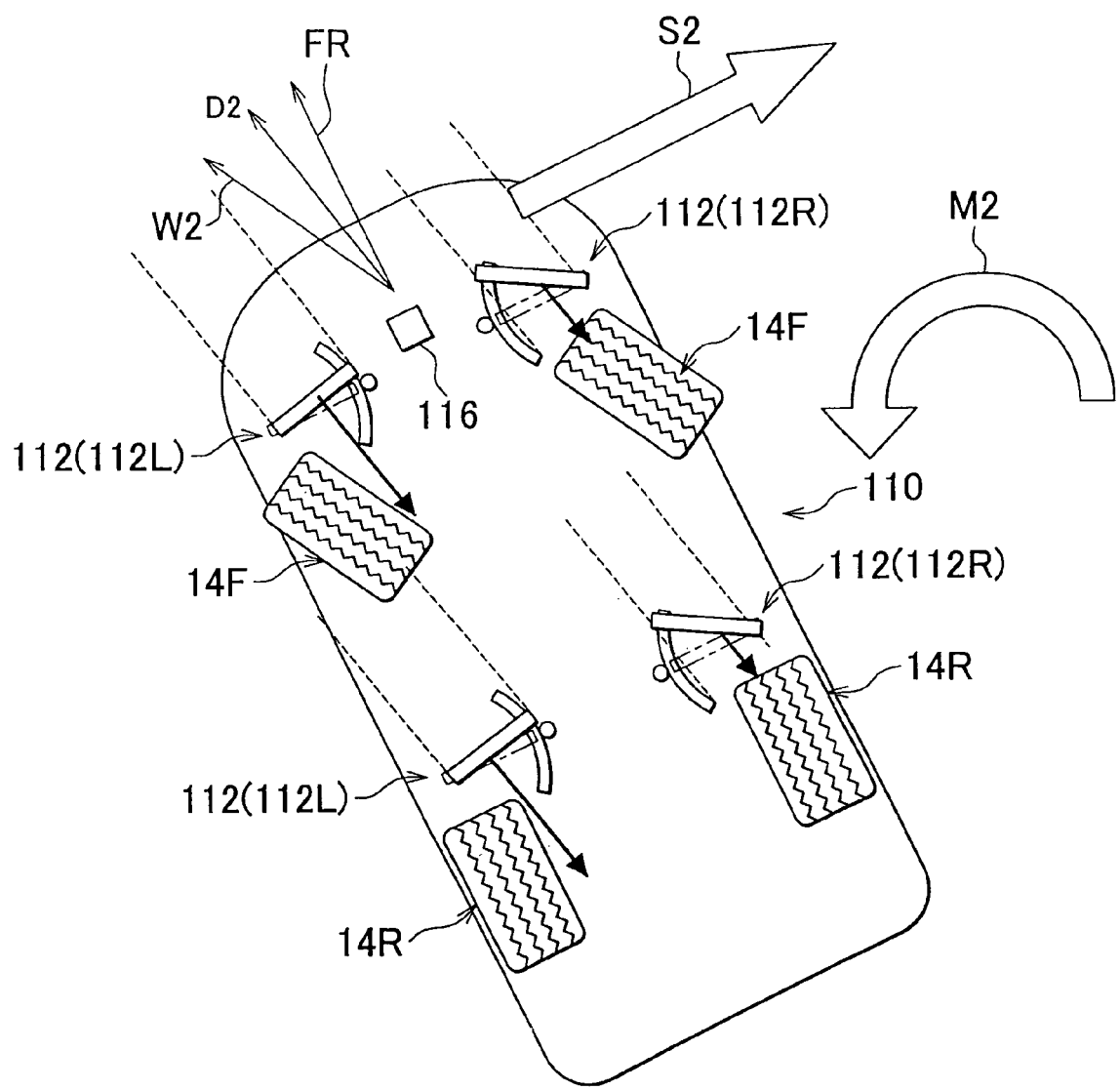

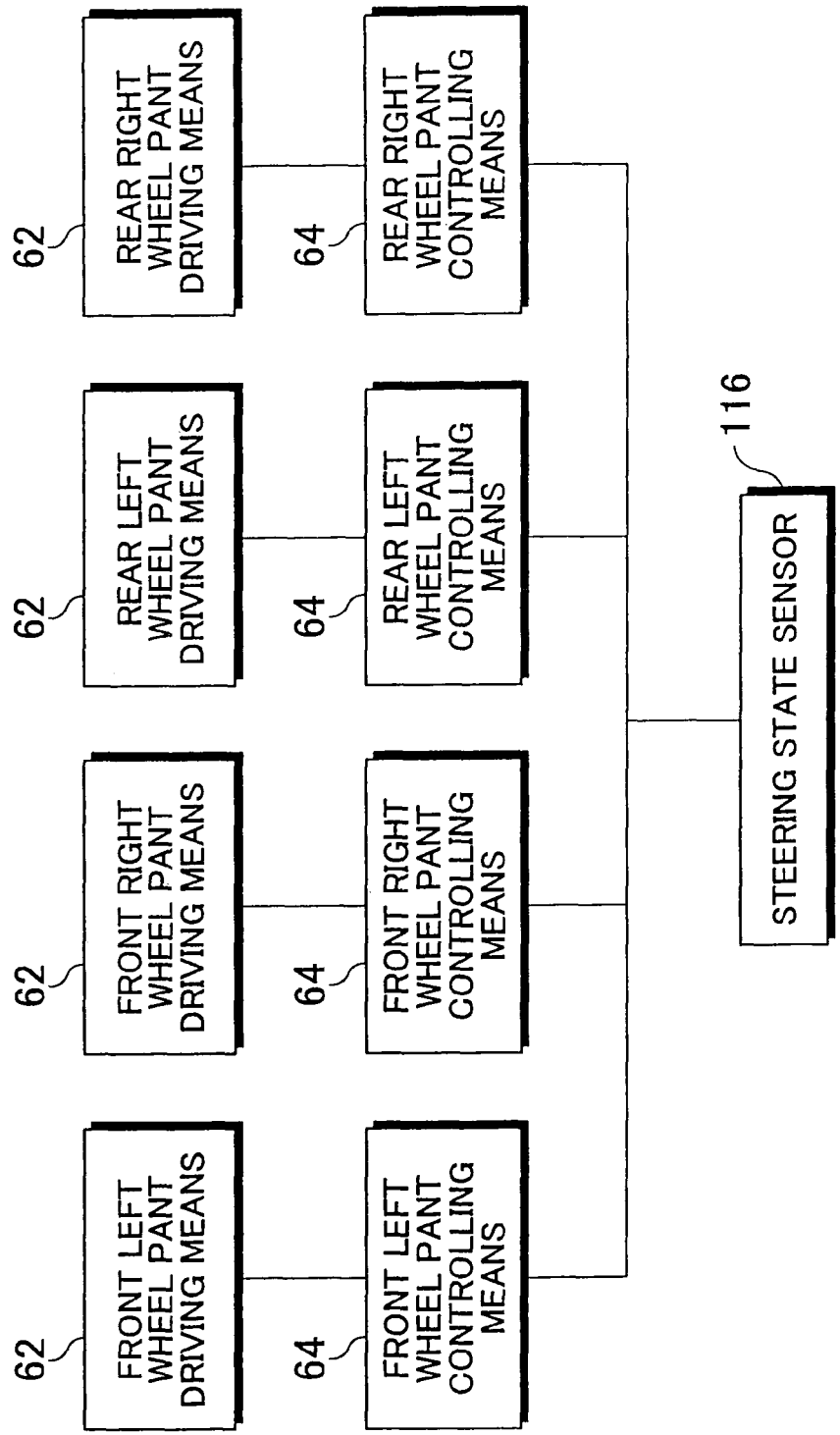

WHEEL PANT DEVICE FOR A VEHICLE AND CONTROL METHOD THEREOF

BACKGROUND OF THE INVENTION

1. Field of the Invention

The invention relates to a wheel pant device for a vehicle and a control method thereof.

2. Description of the Related Art

One example of related art has wheel pants provided in front of a wheel of a vehicle to control the airflow during driving. Japanese Patent Application Publication No. JP-A-5-105124, for example, describes movable wheel pants for a vehicle, which can be lowered or raised to perform yaw control and roll control of the vehicle.

In an actual vehicle, it is desirable to control the airflow acting on the vehicle to an even greater extent in response to the driving state of the vehicle in order to improve the driving characteristics of the vehicle.

SUMMARY OF THE INVENTION

This invention thus aims to provide a vehicle body rectifying device able to improve the driving characteristics of the vehicle by controlling the airflow acting on the vehicle to an even greater extent in response to the driving state of the vehicle, as well as provide a control method of that vehicle body rectifying device.

A wheel pant device for a vehicle according to a first aspect of the invention includes a wheel pant main body arranged in front of a wheel; wheel pant rotating means for driving the wheel pant main body to rotate in the vehicle width direction; vehicle driving state detecting means for detecting a driving state of the vehicle; and controlling means for controlling the wheel pant rotating means based on a detection result from the vehicle driving state detecting means.

Accordingly, when the driving state of the vehicle is detected by the vehicle driving state detecting means, the controlling means then controls the wheel pant rotating means based on that detection result. As a result, the wheel pant main body is rotated in the vehicle width direction, which controls the airflow acting on the vehicle. That is, rotating the wheel pant main body in the vehicle width direction in response to the driving state of the vehicle controls the airflow acting on the vehicle to an even greater extent so the driving characteristics of the vehicle can be improved.

The term "rotating in the vehicle width direction" in this case includes all rotation in which the rotating end moves in the vehicle width direction due to rotation of the wheel pant main body. That is, the term corresponds to all rotation in which the center of rotation has a vertical component. This rotation changes the area of the wheel pant main body when viewed from the longitudinal direction of the vehicle.

The vehicle driving state detecting means may also include slip angle calculating means for calculating a slip angle from the direction in which the vehicle is turning. With this structure, the wheel pant main body that is arranged to the inside with respect to the direction in which the vehicle is turning and the wheel pant main body that is arranged to the outside may be rotated in the direction opposite the direction each other with respect to the direction in which the vehicle is traveling when a absolute value of a calculated value from the slip angle calculating means is equal to or greater than a predetermined value. Accordingly, stability and controllability while turning the vehicle can be improved because the wheel pant main body is rotated in response to the slip angle of the vehicle so as to reduce that slip angle. Further, the wheel pant main body may be rotated to apply an aerodynamic moment in the direction opposite the direction of the slip angle when the absolute value of the calculated value from the slip angle calculating means is equal to or greater than a predetermined value. In this case, the slip angle of the vehicle during a turn can be reduced because the wheel pant main body is rotated in response to the slip angle of the vehicle, thus improving stability and controllability.

Also, the vehicle driving state detecting means may also include steering state detecting means for detecting at least one of oversteer and understeer with respect to the direction in which the vehicle is turning. With this structure, when oversteer of the vehicle is detected by the steering state detecting means, the wheel pant main body arranged on the inside, with respect to the direction in which the vehicle is turning, may be rotated in the direction opposite the direction in which the vehicle is turning, and the wheel pant main body arranged on the outside, with respect to the direction in which the vehicle is turning, may be rotated in the direction in which the vehicle is turning. When understeer of the vehicle is detected by the steering state detecting means, the wheel pant main body arranged on the inside, with respect to the direction in which the vehicle is turning, may be rotated in the direction in which the vehicle is turning, and the wheel pant main body arranged on the outside, with respect to the direction in which the vehicle is turning, may be rotated in the direction opposite the direction in which the vehicle is turning. Further, when oversteer of the vehicle is detected by the steering state detecting means, the wheel pant main body may be controlled to apply an aerodynamic moment in the direction opposite the direction in which the vehicle is turning. In this case, the steering ability can be improved because the wheel pant main body is rotated to apply an aerodynamic moment in the direction opposite the direction in which the vehicle is turning during oversteer of the vehicle. When understeer of the vehicle is detected by the steering state detecting means, the wheel pant main body may be controlled to apply an aerodynamic moment in the direction in which the vehicle is turning. Accordingly, the steering ability can be improved because the wheel pant main body is rotated to apply an aerodynamic moment in the direction in which the vehicle is turning during understeer of the vehicle.

The wheel pant main bodies may be arranged in front of the all wheels, and the controlling means may drive the wheel pant rotating means to rotate all of the wheel pant main bodies based on the detection results from the vehicle driving state detecting means.

Because all of the wheel pant main bodies are rotated based on the detection results from the vehicle driving state detecting means, the area exposed to the airflow of the wheel pants is larger than it is with a structure in which only a portion of the wheel pant main bodies are rotated. As a result, the airflow can be used effectively thus enabling stability and controllability when the vehicle turns to be improved.

The wheel pant device for a vehicle may also include wheel pant raising/lowering means for driving the wheel pant main body up and down in the vertical direction, and vehicle speed detecting means for detecting a speed of the vehicle. Moreover, the controlling means may control the wheel pant raising/lowering means based on the vehicle speed detected by the vehicle speed detecting means.

In this structure, when the vehicle speed is detected by the vehicle speed detecting means, the controlling means controls the wheel pant raising/lowering means in response to that vehicle speed. Accordingly, the airflow acting on the vehicle is controlled by raising/lowering the wheel pant main body. For example, raising/lowering the wheel pant main body to adjust its vertical position when the vehicle is traveling straight enables the fuel efficiency performance of the vehicle to be improved, as well as enables stability and controllability to be further improved.

The wheel pant main body may be changed its length in the vehicle width direction.

With this structure, changing the length in the vehicle width direction of the wheel pant main body enables the area that is exposed to the airflow to be adjusted, in turn making it possible to further improve stability and controllability. For example, by increasing the length of the wheel pant main body at a specific portion, the area exposed to the airflow at that portion can be increased, thereby enabling stability and controllability to be further improved.

A wheel pant device for a vehicle according to a second aspect of the invention comprises the steps of: detecting a driving state of the vehicle; and rotating a wheel pant main body arranged in front of a wheel in a vehicle width direction based on the detected driving state.

A wheel pant device for a vehicle according to a third aspect of the invention comprises: a wheel pant main body arranged in front of a wheel; a wheel pant rotating device which drives the wheel pant main body to rotate in a vehicle width direction; a vehicle driving state detecting device which detects a driving state of the vehicle; and a control device which controls the wheel pant rotating device based on the driving state detected by the vehicle driving state detecting device.

The invention thus makes it possible to better control the airflow acting on the vehicle in response to the driving state of the vehicle, and thus improve the driving performance of the vehicle.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein:

FIG. 4 is a block diagram schematically showing control blocks of the wheel pant device according to the first example embodiment of the invention;

FIG. 14 is another plain view schematically showing the vehicle according to the third example embodiment of the invention in a state in which the wheel pant is operated; and FIG. 15 is a flowchart illustrating the control flow of the wheel pant device according to the third example embodiment of the invention.

DETAILED DESCRIPTION OF THE PREFERRED EMBODIMENTS

Figure 1:
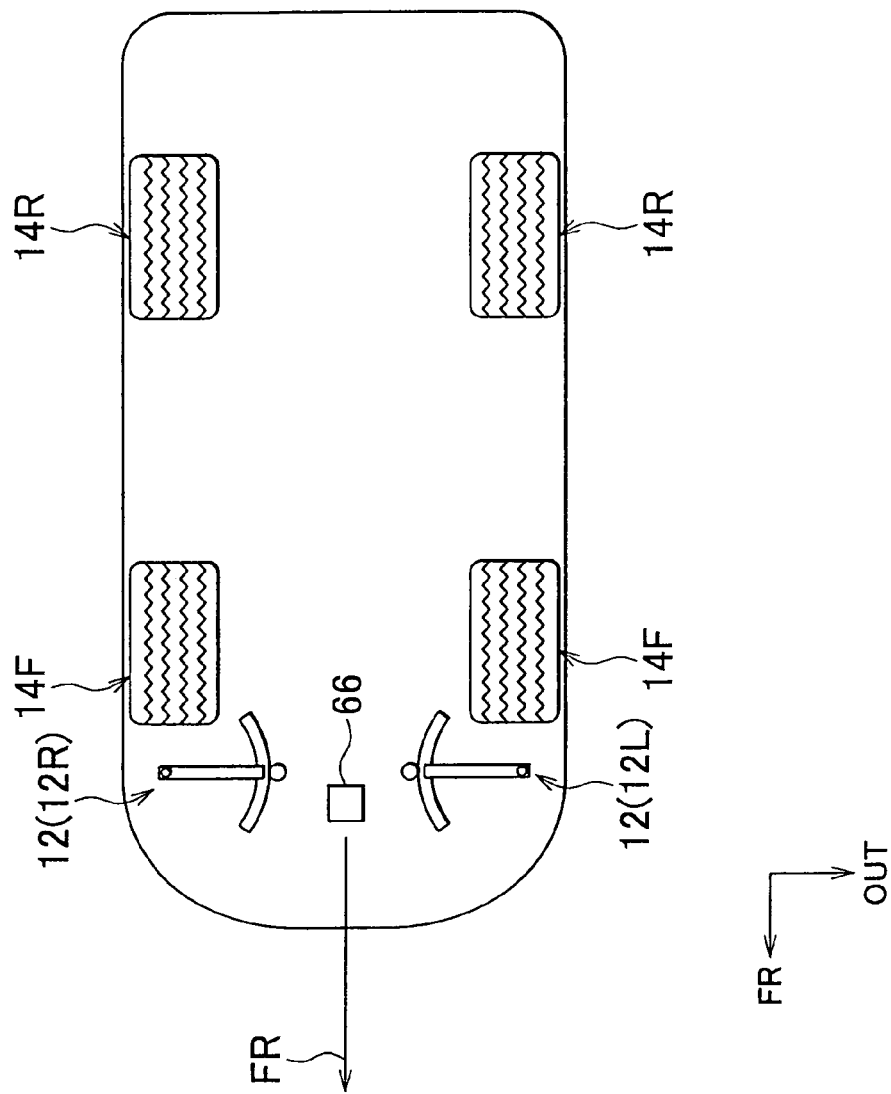
FIG. 1 is a plain view schematically showing the structure of a vehicle according to a first example embodiment of the invention.

FIG. 1 shows a vehicle 10 which is provided with a wheel pant device 12 for a vehicle according to a first example embodiment of the invention. In all of the drawings, the direction to the front of the vehicle is indicated by the arrow FR, the direction upward with respect to the vehicle is indicated by the arrow UP, and the direction to the outside in the vehicle width direction is indicated by the arrow OUT.

As is evident from FIG. 1, in the first example embodiment the wheel pant devices 12 for a vehicle are only provided for front tires 14F of the vehicle and are not provided for rear tires 14R. However, wheel pant devices 112 for a vehicle which have the same structure as the wheel pant devices 12 for a vehicle may also be provided for the rear tires 14 as well, as will be described later in the third example embodiment. Also, hereinafter, when it is necessary to distinguish between the left and right wheel pant devices 12 and 112 for a vehicle, the letter L will be appended to the reference numeral to indicate the left side and the letter R will be appended to the reference numeral to indicate the right side.

Figure 2:
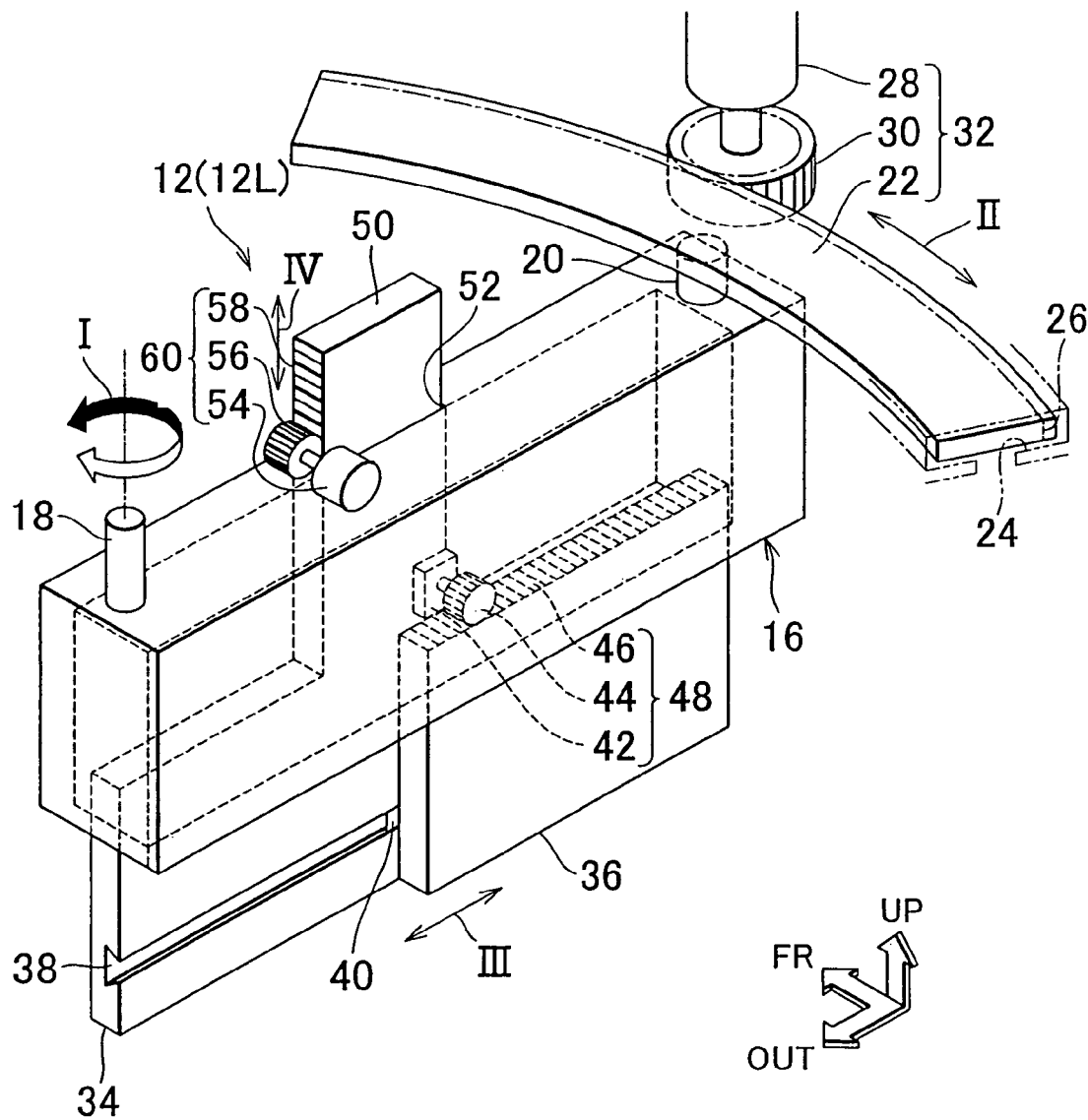
FIG. 2 is a perspective view showing the detailed structure of a wheel pant device according to the first example embodiment of the invention.

FIG. 2 shows the detailed structure of the wheel pant device for a vehicle (hereinafter simply referred to as "wheel pant device"). The example in FIG. 2 shows the wheel pant device 12L positioned on the left side. The wheel pant device 12R positioned on the right side is symmetrically structured and arranged with respect to the vehicle center line.

As shown in FIG. 2, the wheel pant device 12 has a rotating box 16 which is shaped like a box that is open at the bottom. A pivot shaft 18 protrudes upward from the outside end portion, in the width direction of the vehicle, of the rotating box 16 and is inserted into an insertion hole of a vehicle main body, not shown, in a non-detachable manner. The rotating box 16 rotates around this pivot shaft 18 as shown by arrow I.

A rack bar 22 is fixed by a connecting pin 20 to an inside end portion, in the width direction of the vehicle, of the rotating box 16. This rack bar 22 is formed in an arc shape around the pivot shaft 18 and is received in a receiving concave portion 24 formed in the vehicle body. A rack gear 26 is formed on the outside surface of the rack bar 22 and is in mesh with a pinion gear 30 that is driven by a motor 28. Accordingly, driving the motor 28 rotates the pinion gear 30, which moves the rack bar 22 in the direction of arrow II as it is guided in the receiving concave portion 24. When this rack bar 22 moves, it also causes the rotating box 16 to rotate around the pivot shaft 18. The motor 28, the pinion gear 30, and the rack bar 22 (rack gear 26) collectively constitute wheel pant rotating means 32.

Figure 3A:
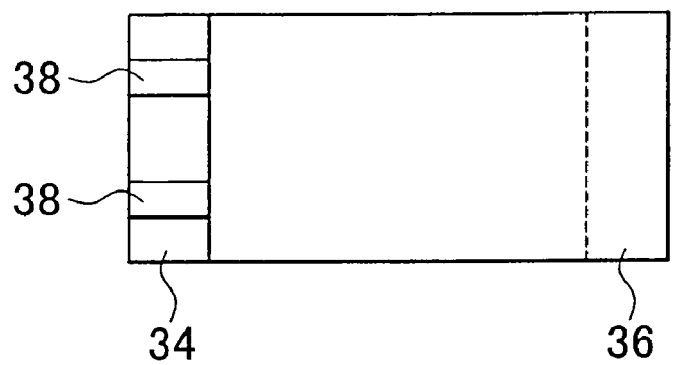
FIGS. 3A and 3B are views showing a wheel pant plate of the wheel pant device according to the first example embodiment in different sliding states, with FIG. 3A showing a small sliding amount and FIG. 3B showing a large sliding amount.
Figure 3B:
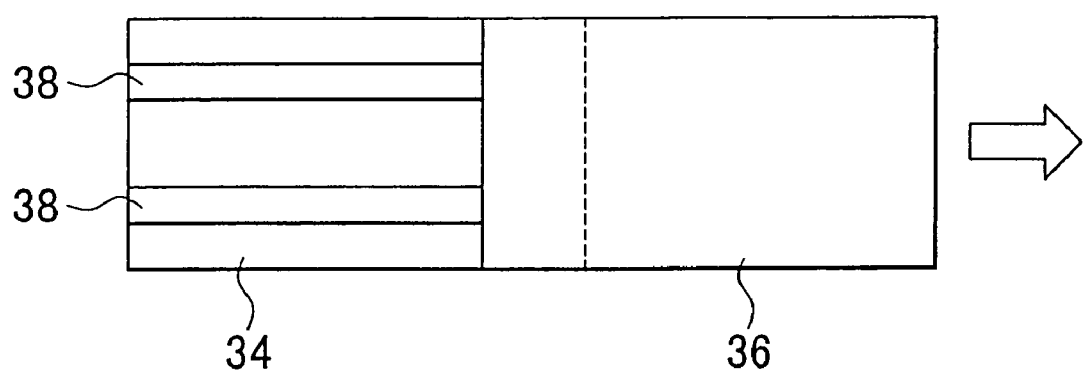

The rotating box 16 houses two wheel pant plates 34 and 36. As shown in FIGS. 3A and 3B, these wheel pant plates 34 and 36 are approximately the same size and arranged so as to overlap one another in the longitudinal direction of the vehicle. As shown in detail in FIGS. 3A and 3B, two engaging grooves 38 are formed in the vehicle width direction in the back surface of the wheel pant plate 34 that is positioned on the front side of the vehicle. Engaging protruding portions 40 which fit in the engaging grooves 38 and non-detachably engage therewith protrude from the front surface of the wheel pant plate 36 on the rear side of the vehicle (the engaging protruding portion 40 that engages with the upper side engaging groove 38 is not shown in FIG. 2).

Also, a motor 42 and a pinion gear 44 are mounted to the wheel pant plate 34. The pinion gear 44 is in mesh with a rack gear 46 formed on the upper surface of the wheel pant plate 36. When the pinion gear 44 is rotated by driving the motor 42, the wheel pant plate 36 slides in the vehicle width direction (i.e., the direction of arrow III) with respect to the wheel pant plate 34 while the engaging protruding portions 40 remain engaged with the engaging grooves 38. The motor 42, the pinion gear 44, and the rack gear 46 together constitute wheel pant width changing means 48.

An elevating guide plate 50 extends upward from the wheel pant plate 34 and fits through a guide hole 52 formed in the rotating box 16. A motor 54 and a pinion gear 56 are mounted to the upper surface of the rotating box 16. The pinion gear 56 is in mesh with a rack gear 58 formed on the elevating guide plate 50. When the motor 54 is driven to rotate the pinion gear 56, the elevating guide plate 50 and the wheel pant plate 34 raise and lower in the direction of arrow IV while the elevating guide plate 50 remains inserted through and guided by the guide hole 52. The motor 54, the pinion gear 56, and the rack gear 58 together constitute wheel pant raising/lowering means 60.

Hereinafter, the wheel pant rotating means 32, the wheel pant width changing means 48, and the wheel pant raising/lowering means 60 will be collectively referred to as wheel pant driving means 62. As shown in FIG. 4, the wheel pant driving means 62 is controlled by controlling means 64 independently for each wheel pant device 12 corresponding to each tire.

As shown in FIGS. 1 and 4, the vehicle 10 is provided with a slip angle sensor 66 that detects the driving state of the vehicle and calculates the slip angle. The calculated value of the slip angle that is calculated by the slip angle sensor 66 is then sent to each controlling means 64. An appropriate combination of, for example, a yaw rate sensor, a lateral G sensor, a wheel speed sensor, and the like is used for the slip angle sensor 66. The slip angle can be estimated from the data obtained from each of these sensors and the direction in which the driver intends the vehicle 10 to travel (i.e., the deviation from the direction of the longitudinal plane of symmetry of the front wheels).

Figure 5:
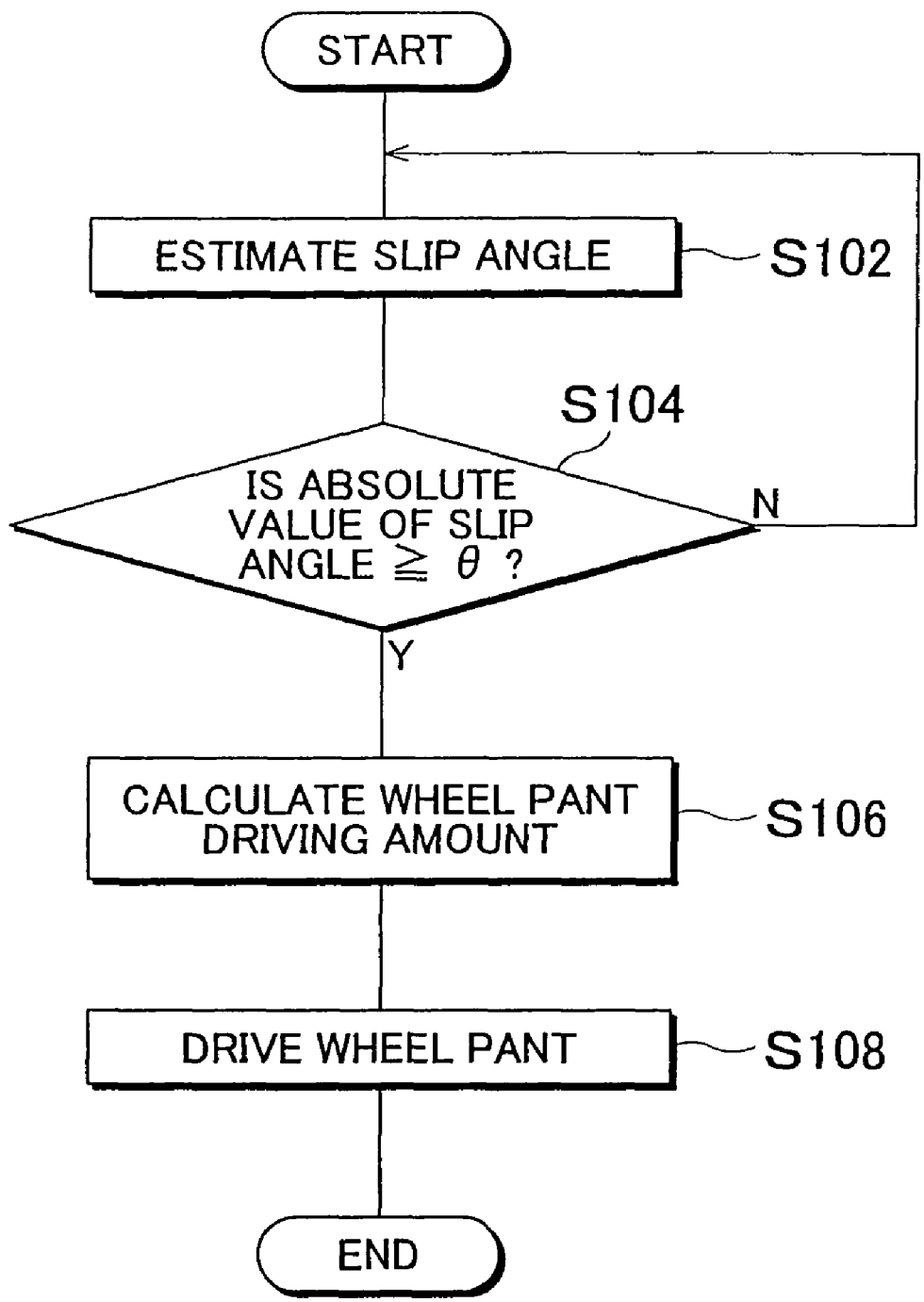
FIG. 5 is a flowchart illustrating the control flow of the wheel pant device according to the first example embodiment of the invention.

In this example embodiment structured in this way, drive control of the wheel pant plates 34 and 36 is performed according to the flow illustrated in FIG. 5.

Figure 6A:
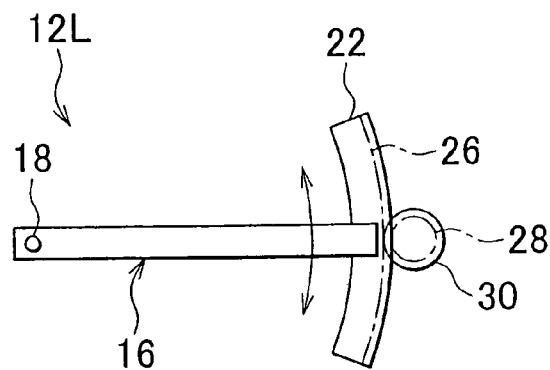
FIGS. 6A to 6C are plain views schematically showing the structure of the wheel pant device according to the first example embodiment of the invention, with FIG. 6A showing the device in a non-rotated state and FIGS. 6B and 6C showing the device in different rotated states.
Figure 6B:
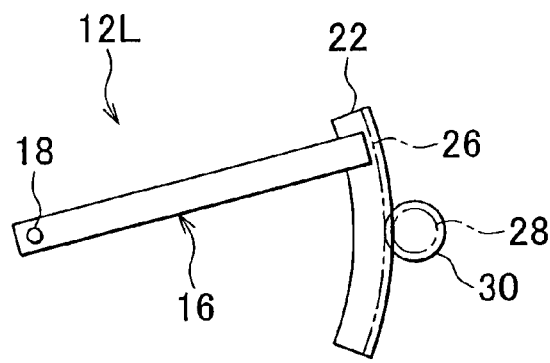
Figure 6C:
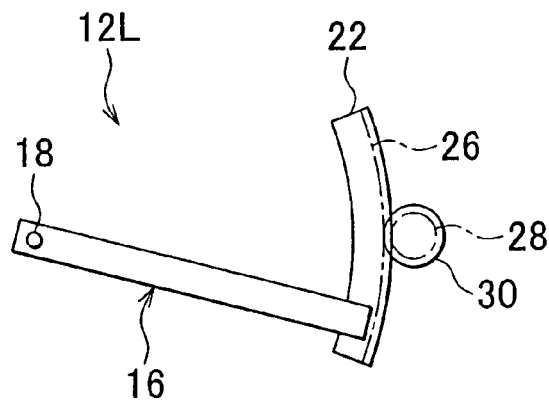
Figure 7:
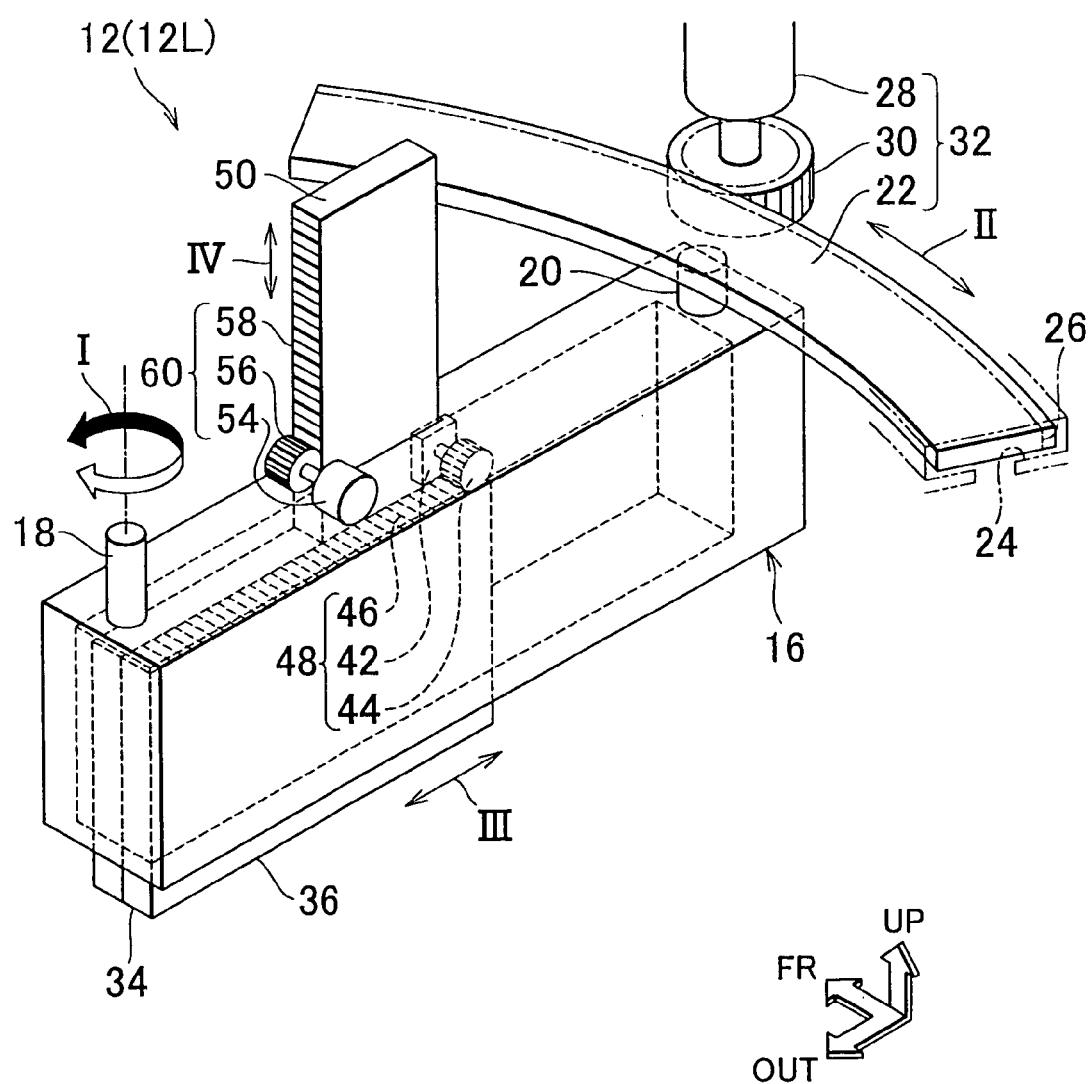
FIG. 7 is a perspective view illustrating the operation of the wheel pant device according to the first example embodiment of the invention.

First, as shown in FIGS. 1 and 6A, before the vehicle starts to run or right after the vehicle starts to run, the wheel pant plates 34 and 36 (i.e., the rotating box 16) are pointing orthogonal to the longitudinal direction of the vehicle. Also, in view of further reducing air resistance during running, the wheel pant plate 36 is in a position in which it overlaps with the wheel pant plate 34 as much as possible and its area when viewed from the front is small, as shown in FIG. 7. Also to further reduce air resistance during running, the wheel pant plates 34 and 36 are also raised to the highest position.

When the vehicle is running, the slip angle is first estimated in step S102. Then in step S104, it is determined whether the absolute value of that slip angle is equal to or greater than a threshold value θ set in advance. If the absolute value of the slip angle is less than the threshold value θ, the process returns to step S102. If, on the other hand, the absolute value of the slip angle is equal to or greater than the threshold value θ, the controlling means 64 then calculates an appropriate wheel pant driving amount in step S106. This appropriate wheel pant driving amount is a rotating direction and rotation angle for rotating the wheel pant plates 34 and 36, a sliding amount for sliding the wheel pant plates 34 and 36, and a raising/lowering amount for raising/lowering the wheel pant plates 34 and 36, in order to reduce the slip angle to less than the threshold value θ.

Figure 8:
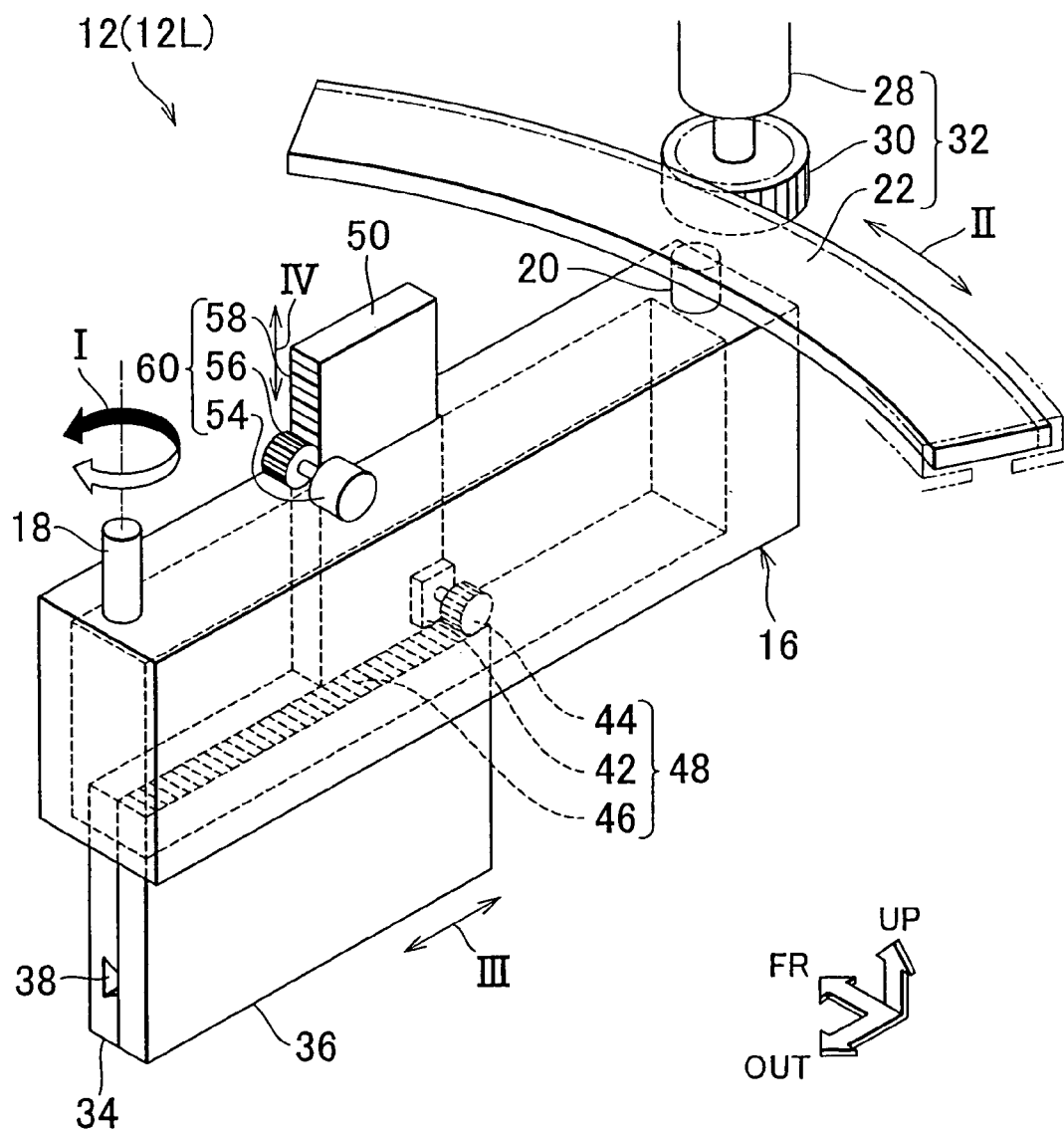
FIG. 8 is another perspective view illustrating the operation of the wheel pant device according to the first example embodiment of the invention.

In step S108, the wheel pant plates 34 and 36 are driven such that the slip angle is reduced, which enables stability and controllability to be improved. At this time, the motor 54 is first driven based on the raising/lowering amount obtained in step S106 to lower the wheel pant plates 34 and 36 a predetermined amount, as shown in FIG. 8. Next, the motor 42 is driven based on the sliding amount obtained in step S106 to slide the wheel pant plate 36 a predetermined amount with respect to the wheel pant plate 34, as shown in FIG. 2.

Figure 9:
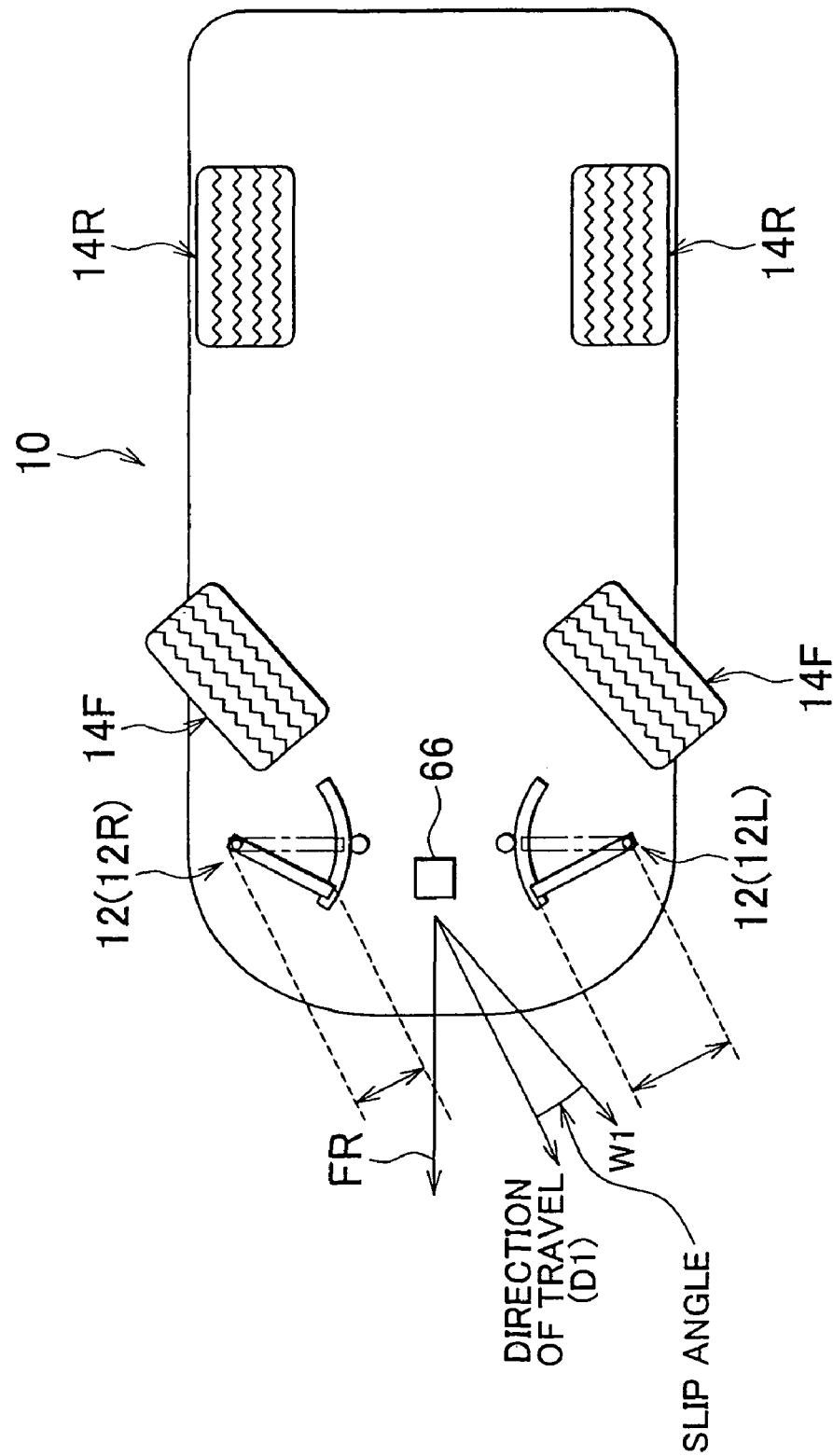
FIG. 9 is a plain view schematically showing the vehicle according to the first example embodiment of the invention in a state in which the wheel pant is operated.

Here, when the wheel pant plates 34 and 36 are rotated and the slip angle reduced, for example, the wheel pant device 12 on the inside in the direction in which the vehicle is turning rotates in the direction in which the vehicle is turning so its area as viewed from the direction of travel increases. Meanwhile, the wheel pant device 12 arranged on the outside rotates in the direction opposite the direction in which the vehicle is turning so its area as viewed from the direction of travel decreases. In the example shown in FIG. 9, the vehicle 10 is turning to the left and the actual direction of travel D1 with respect to the direction in which the vehicle is trying to travel W1 creates a slip angle to the right. As a result, for example, the wheel pant device 12L arranged on the left side is rotated counterclockwise, so the area as viewed from the direction of travel of the wheel pant plates 34 and 36 increases, and the wheel pant device 12R arranged on the right side is rotated clockwise, so the area as viewed from the direction of travel of the wheel pant plates 34 and 36 decreases.

The motor 42 may be driven to slide the wheel pant plate 36 with respect to the wheel pant plate 34 and reduce the slip angle as necessary. That is, as described above, in order to reduce the slip angle, the wheel pant plates 34 and 36 may be slid, for example, such that the area as viewed from the direction of travel of the wheel pant plates 34 and 36 on the inside in the direction in which the vehicle is turning increases and the area as viewed from the direction of travel of the wheel pant plates 34 and 36 on the outside in the direction in which the vehicle is turning decreases. Similarly, the slip angle may also be reduced by driving the motor 54 and raising/lowering the wheel pant plates 34 and 36. That is, the operation to change the area as viewed from the direction of travel of the wheel pant plates 34 and 36 in this way may be performed not only by rotating the wheel pant plates 34 and 36, but also by raising/lowering them as well as by sliding the wheel pant plate 36.

Further, the raising/lowering amount of the wheel pant plates 34 and 36 and the sliding amount of the wheel pant plate 36 may be set appropriately according to the amount that the slip angle should be adjusted. However, when sliding the wheel pant plate 36, it is necessary to ensure that the wheel pant plate 36 that has been slid does not contact any other members, which means that the sliding range is limited. Also, when raising/lowering the wheel pant plates 34 and 36, it is necessary to ensure that they will not interfere with the road surface.

Also, in this example embodiment, in addition to performing control to reduce the slip angle as described above, it is also possible to control the wheel pant plates 34 and 36 to apply an aerodynamic moment in the direction of the turn in response to the slip angle. In this case, in the flow illustrated in FIG. 5, the wheel pant driving amount calculated in step S106 may be changed to a wheel pant driving amount that obtains a desired aerodynamic moment. Controlling the wheel pant plates 34 and 36 in this way to obtain a desired aerodynamic moment when the vehicle turns reduces the slip angle of the vehicle, thereby enabling stability and controllability to be improved.

Figure 10:
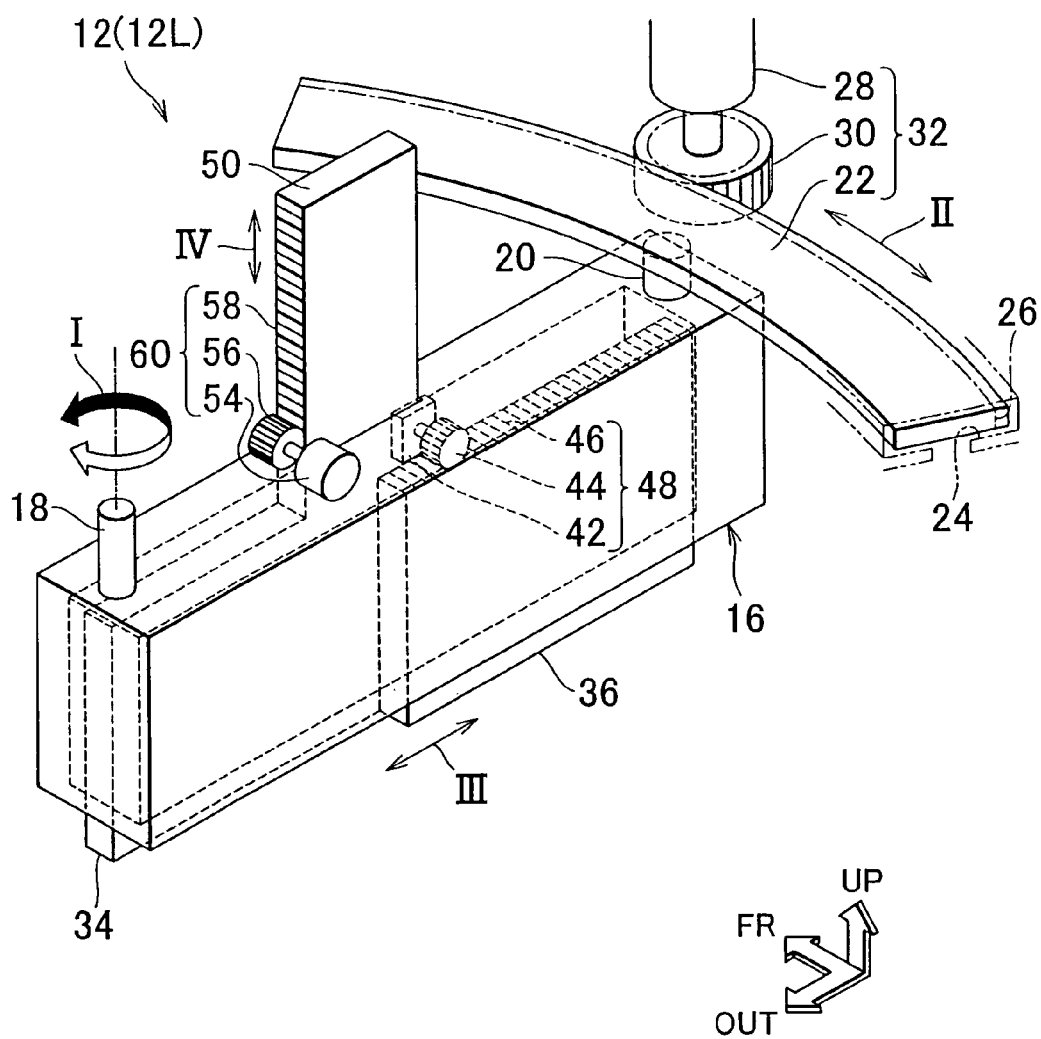
FIG. 10 is another perspective view illustrating the operation of the wheel pant device according to the first example embodiment of the invention.

In the above description, when driving the wheel pant device 12 from the state illustrated in FIG. 7 to the state illustrated in FIG. 2, the wheel pant plates 34 and 36 are first lowered as shown in FIG. 8, and the wheel pant plate 36 is then slid. Alternatively, the wheel pant plate 36 may first be slid as shown in FIG. 10, and then the wheel pant plates 34 and 36 may be lowered.

Also in the invention, a structure which lowers the wheel pant plates 34 and 36 and a structure which slides the wheel pant plate 36 are not necessary. That is, the wheel pant plates 34 and 36 may alternatively be fixed, so as to be unable to slide or raise/lower, in a position in which they are constantly exposed to wind generated as the vehicle runs. Even with this construction, as long as the wheel pant plates 34 and 36 (i.e., the rotating box 16) are at least able to rotate, the slip angle still can be adjusted.

Figure 11:
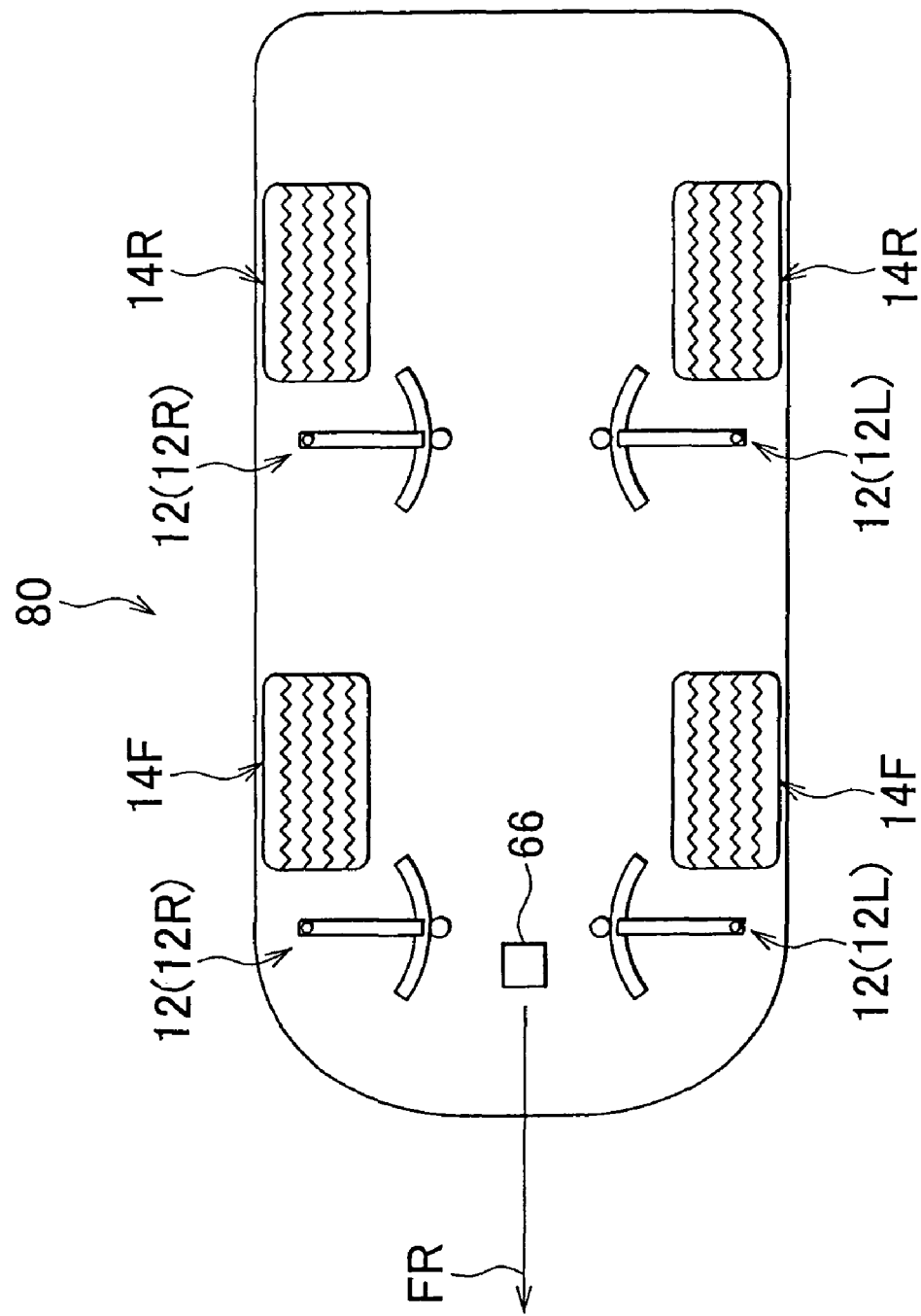
FIG. 11 is a plain view schematically showing the structure of a vehicle according to a second example embodiment of the invention.
Figure 12:
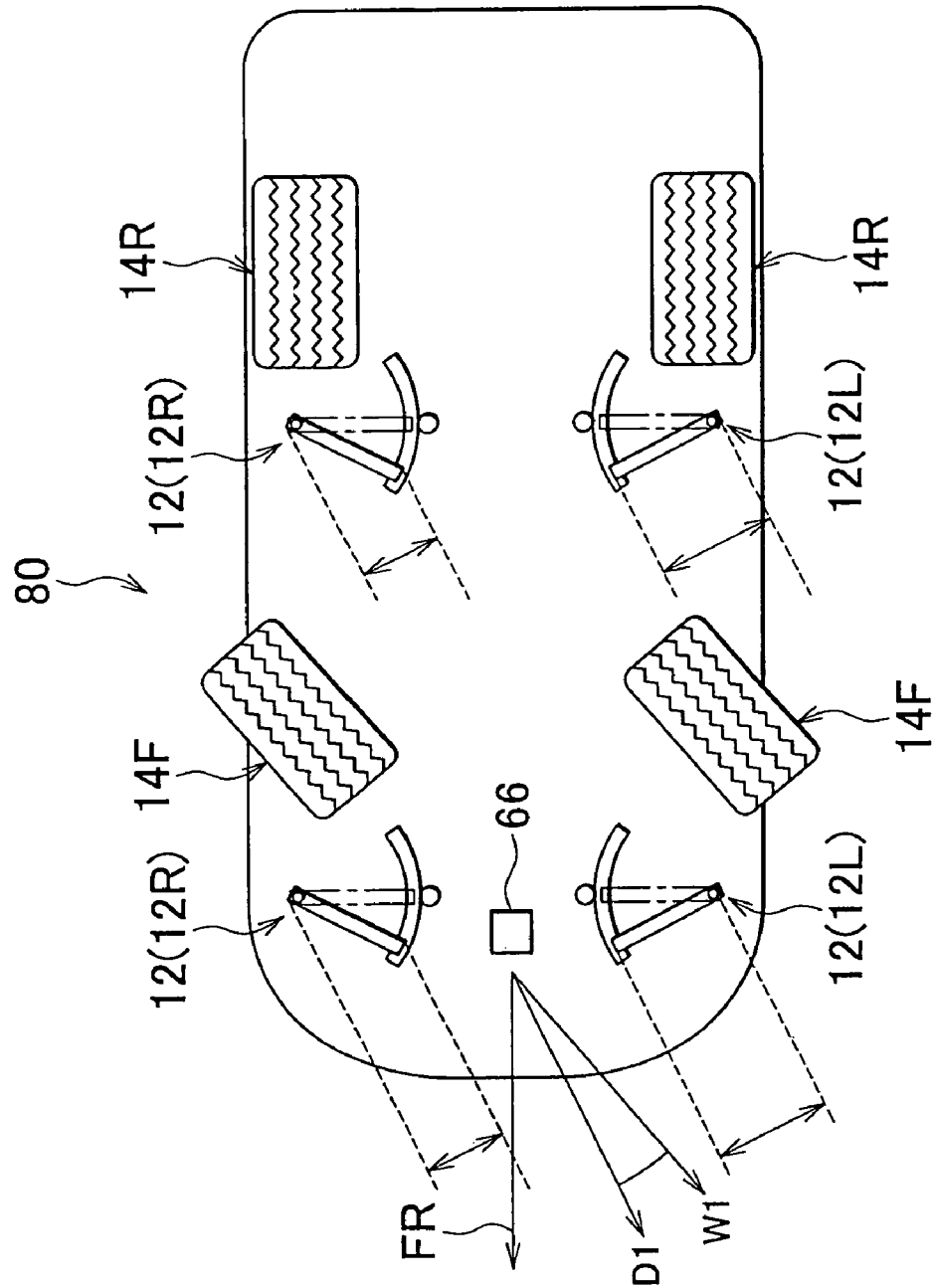
FIG. 12 is a plain view schematically showing the vehicle according to the second example embodiment of the invention in a state in which a wheel pant is operated.

FIGS. 11 and 12 show a vehicle 80 according to a second example embodiment of the invention. In this second example embodiment, a wheel pant device 12 that has the same structure as that in the first example embodiment is provided for not only the front tires 14F but also for the rear tires 14R.

In the second example embodiment, because the wheel pant device 12 is provided for all of the tires in this way, when it is desirable to reduce the slip angle, for example, the slip angle can be reduced even more effectively than it can be in the first example embodiment by driving all of the wheel pant devices 12, as shown in FIG. 12. Meanwhile, all of the wheel pant devices 12 may be rotated in the same direction to increase the area of the wheel pant plates 34 and 36 that is exposed to airflow with respect to the direction in which the vehicle is turning, thus enabling the airflow to be used even more effectively. As a result, vehicle stability can be improved even more.

Figure 13:
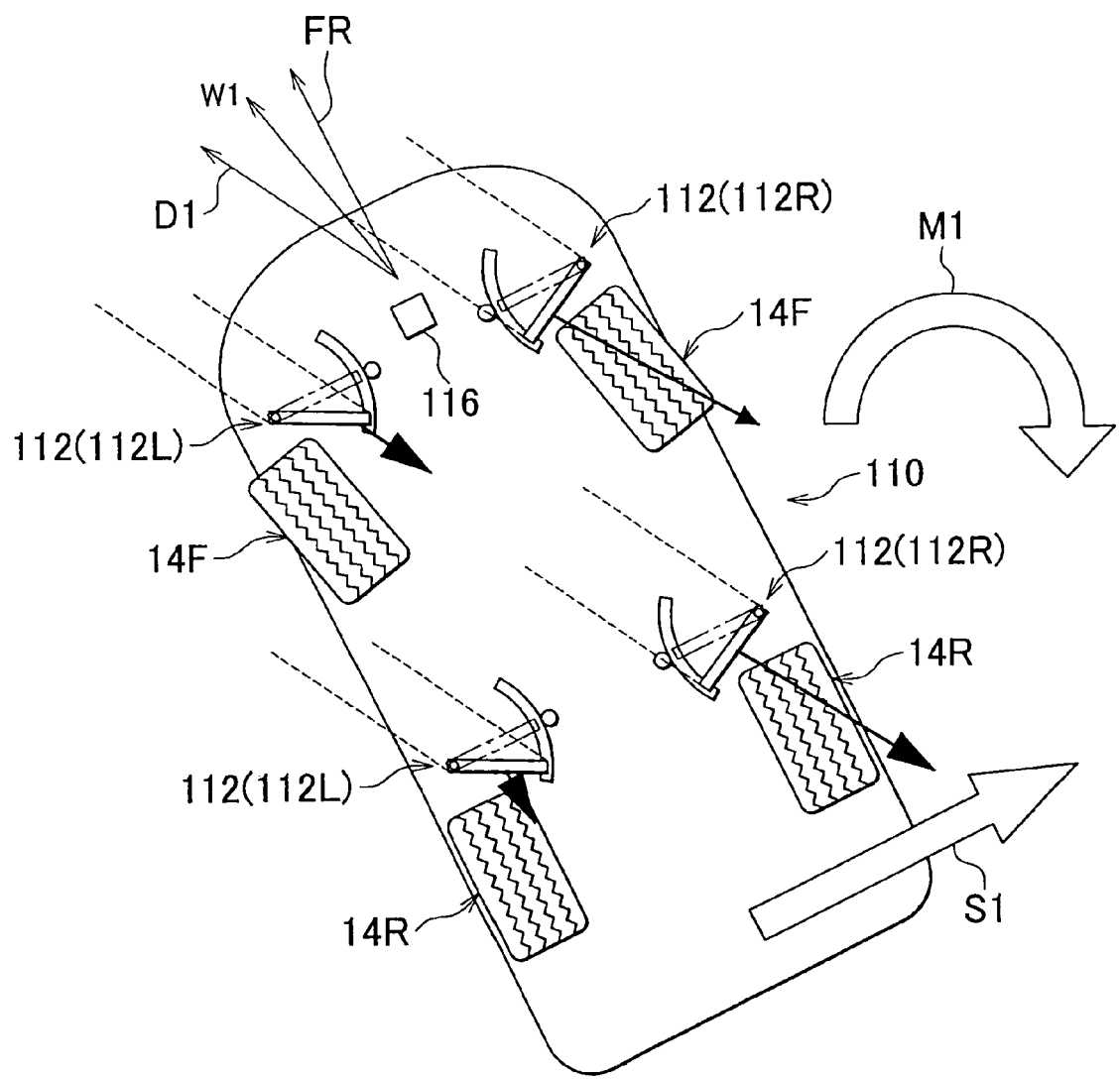
FIG. 13 is a plain view schematically showing a vehicle according to a third example embodiment of the invention in a state in which a wheel pant is operated.

FIGS. 13 and 14 show a vehicle 110 provided with wheel pant devices 112 according to a third example embodiment of the invention. In this third example embodiment, the wheel pant devices 112 are provided not only for the front tires 14F of the vehicle 110, but also for the rear tires 14R.

The vehicle 110 provided with wheel pant devices 112 in the third example embodiment are provided with a steering state sensor 116 capable of detecting oversteer or understeer of the vehicle 110, as also shown in FIG. 15, instead of (or in combination with) the slip angle sensor 66 in the first example embodiment. The wheel pant devices 112 are controlled to improve stability and controllability of the vehicle based on the steering state detected by this steering state sensor 116. That is, when oversteer or understeer of the vehicle 110 is detected, there is a deviation between the direction in which the driver intends the vehicle 110 to travel and the actual direction of travel of the vehicle 110. Accordingly, when oversteer of the vehicle 110 is detected during turning to the left, for example, the wheel pant device 112 on the inside in the direction in which the vehicle is turning is rotated clockwise i.e. in the direction opposite the direction in which the vehicle is turning, while the wheel pant device 112 on the outside in the direction in which the vehicle is turning is rotated counterclockwise i.e. in the direction in which the vehicle is turning. When understeer of the vehicle 110 is detected during turning to the left, for example, the wheel pant device 112 on the inside in the direction in which the vehicle is turning is rotated counterclockwise i.e. in the direction in which the vehicle is turning, while the wheel pant device 112 on the outside in which the vehicle is turning is rotated clockwise i.e. in the direction opposite the direction in which the vehicle is turning. As a result, the wheel pant devices 112 are controlled to apply an aerodynamic moment in the direction to correct oversteer or understeer of the vehicle 110, thereby improving stability and controllability of the vehicle 110.

As shown in FIG. 13, for example, when the driver wants the vehicle to travel to the left in the direction W1 and oversteers such that a counterclockwise moment is generated in the vehicle (refer to the direction of travel shown by arrow D1), the wheel pant device 112 is driven so that a clockwise (i.e., in the direction opposite the direction in which the vehicle is turning) aerodynamic moment M1 is applied. Conversely, as shown in FIG. 14, for example, when the driver wants the vehicle to travel to the left in the direction W2 and understeers such that a clockwise moment is generated in the vehicle (refer to the direction of travel shown by arrow D2), the wheel pant device 112 is driven so that a counterclockwise (i.e., in the same direction as the direction in which the vehicle is turning) aerodynamic moment M2 is applied.

In the third example embodiment, the motor 42 may be driven to slide the wheel pant plate 36 with respect to the wheel pant plate 34, and the motor 44 may be driven to raise/lower the wheel pant plates 34 and 36, similar to the first example embodiment.

Also in the third example embodiment, if the appropriate rotational moment is obtained, it is not always necessary to drive all four of the wheel pant devices 112. However, when there is oversteer, for example, the rear tires 14R in particular often tend to slip, as shown by arrow S1 in FIG. 13. Therefore, the wheel pant devices 112 corresponding to the rear tires 14R may be actively driven to obtain a clockwise moment. Further, when there is understeer, the front tires 14F in particular often tend to slip, as shown by arrow S2 in FIG. 14. Therefore, the wheel pant devices 112 corresponding to the front tires 14F may be actively driven to obtain a counterclockwise moment.

The steering state sensor 116 in the third example embodiment can be structured to detect the direction of travel intended by the driver using a steering angle sensor or the like, and calculate the difference between that direction and the actual direction of travel of the vehicle 110.

As described above, in the example embodiments of the invention, stability and controllability of the vehicle can be further improved by driving the wheel pant devices based on the slip angle or the steering state of the vehicle. Also, the wheel pant devices can also be driven so as not to excessively increase the air resistance that acts on the vehicle, which also enables the fuel efficiency performance of the vehicle to be improved. Moreover, fuel efficiency performance as well as stability and controllability of the vehicle can be further improved by driving the wheel pant devices not only when the vehicle is turning but also when it is traveling straight. The control when the vehicle is traveling straight may be performed based, for example, on data for the vehicle speed detected by vehicle speed detecting means (the control may be based on the vehicle speed alone but may be performed also taking into account the acceleration and the like). The control when the vehicle is turning may also of course be performed using data for the vehicle speed detected by the vehicle speed detecting means.

In the foregoing description, an example was given in which there is a pair of wheel pant devices on the left and right of the vehicle. However, even if only one wheel pant device is provided in the center in the vehicle width direction, for example, it is still possible to reduce the slip angle and apply an appropriate rotating moment to the vehicle by rotating that wheel pant device in the vehicle width direction.

While the invention has been described with reference to exemplary embodiments thereof, it is to be understood that the invention is not limited to the exemplary embodiments or constructions. To the contrary, the invention is intended to cover various modifications and equivalent arrangements. In addition, while the various elements of the exemplary embodiments are shown in various combinations and configurations, which are exemplary, other combinations and configurations, including more, less or only a single element, are also within the spirit and scope of the invention.

The invention claimed is:

1. A wheel pant device for a vehicle, comprising:
   a plurality of wheel pant main bodies, each wheel pant main body being arranged in front of a wheel;
   a wheel pant rotating device which drives at least one of the plurality of wheel pant main bodies to rotate in a vehicle width direction;
   a vehicle driving state detecting device which detects a driving state of the vehicle and which includes a slip angle sensor which calculates a slip angle from the direction in which the vehicle is turning; and
   a control device which controls the wheel pant rotating device based on the slip angle calculated by the slip angle sensor;
   wherein when a detected value from the slip angle sensor is equal to or greater than a predetermined value set in advance, a first wheel pant main body arranged on the inside, with respect to the direction in which the vehicle is turning, is rotated in the direction in which the vehicle is turning, and a second wheel pant main body arranged on the outside, with respect to the direction in which the vehicle is turning, is rotated in the direction opposite the direction in which the vehicle is turning.

2. The wheel pant device for a vehicle according to claim 1, wherein when a calculated value from the slip angle sensor is equal to or greater than a predetermined value set in advance, at least one of the plurality of the wheel pant main bodies is rotated to apply an aerodynamic moment in the direction opposite the direction of the slip angle.

3. The wheel pant device for a vehicle according to claim 1, wherein the wheel pant main bodies are arranged in front of all of the wheels, and
   the control device drives the wheel pant rotating device to rotate all of the wheel pant main bodies based on the detection results from the vehicle driving state detecting device.

4. The wheel pant device for a vehicle according to claim 1, wherein the wheel pant main bodies are arranged in front of all of the all wheels, and
   the control device drives the wheel pant rotating device to rotate all of the wheel pant main bodies in the direction in which the vehicle is turning based on the detection results from the vehicle driving state detecting device.

5. A wheel pant device for a vehicle according to claim 1, further comprising:
   a wheel pant raising/lowering device which drives at least one of the plurality of the wheel pant main bodies up and down in the vertical direction; and
   a vehicle speed detecting device which detects a speed of the vehicle,
   wherein the control device controls the wheel pant raising/lowering device based on the vehicle speed detected by the vehicle speed detecting device.

6. The wheel pant device for a vehicle according to claim 1, wherein the length in the vehicle width direction of at least one of the plurality of the wheel pant main bodies is variable.

7. A wheel pant device for a vehicle, comprising:
   a plurality of wheel pant main bodies, each wheel pant main body being arranged in front of a wheel;
   a wheel pant rotating device which drives at least one of the plurality of wheel pant main bodies to rotate in a vehicle width direction;
   a vehicle driving state detecting device which detects a driving state of the vehicle; and
   a controlling device which controls the wheel pant rotating device based on the driving state detected by the vehicle driving state detecting device,
   wherein the vehicle driving state detecting device includes a steering state detecting device for detecting at least one of oversteer and understeer with respect to the direction in which the vehicle is turning;
   wherein when a detected value from the steering state detecting device is equal to or greater than a predetermined value set in advance, a first wheel pant main body arranged on the inside, with respect to the direction in which the vehicle is turning, is rotated in the direction in which the vehicle is turning, and a second wheel pant main body arranged on the outside, with respect to the direction in which the vehicle is turning, is rotated in the direction opposite the direction in which the vehicle is turning.

8. The wheel pant device for a vehicle according to claim 7, wherein when oversteer of the vehicle is detected by the steering state detecting device, at least one of the plurality of the wheel pant main bodies is controlled to apply an aerodynamic moment in the direction opposite the direction in which the vehicle is turning.

9. The wheel pant device for a vehicle according to claim 7, wherein when understeer of the vehicle is detected by the steering state detecting device, at least one of the plurality of the wheel pant main bodies is controlled to apply an aerodynamic moment in the direction in which the vehicle is turning.

10. A wheel pant device for a vehicle, comprising:
   a wheel pant main body arranged in front of a wheel;
   a wheel pant rotating device which drives the wheel pant main body to rotate in a vehicle width direction;
   a vehicle driving state detecting device which detects a driving state of the vehicle: and
   a controlling device which controls the wheel pant rotating device based on the driving state detected by the vehicle driving state detecting device,
   wherein the vehicle driving state detecting device includes a steering state detecting device for detecting at least one of oversteer and understeer with respect to the direction in which the vehicle is turning, and wherein when oversteer of the vehicle is detected by the steering state detecting device, the wheel pant main body arranged on the inside, with respect to the direction in which the vehicle is turning, is rotated in the direction opposite the direction in which the vehicle is turning, and the wheel pant main body arranged on the outside, with respect to the direction in which the vehicle is turning, is rotated in the direction in which the vehicle is turning, and when understeer of the vehicle is detected by the steering state detecting device, the wheel pant main body arranged on the inside, with respect to the direction in which the vehicle is turning, is rotated in the direction in which the vehicle is turning, and the wheel pant main body arranged on the outside, with respect to the direction in which the vehicle is turning, is rotated in the direction opposite the direction in which the vehicle is turning.

11. A control method for a wheel pant device for a vehicle, comprising:

detecting a driving state of the vehicle including using a slip angle sensor to calculate a slip angle from the direction in which the vehicle is turning; and rotating a plurality of wheel pant main bodies in a vehicle width direction based on the calculated slip angle, each wheel pant main body being arranged in front of a wheel;

wherein when a detected value from the slip angle sensor is equal to or greater than a predetermined value set in advance, a first wheel pant main body arranged on the inside, with respect to the direction in which the vehicle is turning, is rotated in the direction in which the vehicle is turning, and a second wheel pant main body arranged on the outside, with respect to the direction in which the vehicle is turning, is rotated in the direction opposite the direction in which the vehicle is turning.

* * * * *